US00RE39249E

(19) United States
(12) Reissued Patent
Link, Jr.

(10) Patent Number: US RE39,249 E
(45) Date of Reissued Patent: Aug. 29, 2006

(54) LIQUID DELIVERY VEHICLE WITH REMOTE CONTROL SYSTEM

(75) Inventor: Clarence J. Link, Jr., 2648 SW. 111th St., Oklahoma City, OK (US) 73170

(73) Assignee: Clarence J. Link, Jr., Oklahoma City, OK (US)

(21) Appl. No.: 09/925,825

(22) Filed: Aug. 10, 2001

Related U.S. Patent Documents

Reissue of:
(64) Patent No.: 5,975,162
Issued: Nov. 2, 1999
Appl. No.: 09/054,221
Filed: Apr. 2, 1998

(51) Int. Cl.
*B65B 1/04* (2006.01)

(52) U.S. Cl. ..... 141/231; 141/192; 222/627; 222/608; 239/172; 239/195

(58) Field of Classification Search ..... 141/231, 141/192, 98, 94; 137/456; 222/627, 626, 222/628, 608; 417/316; 239/172, 195
See application file for complete search history.

(56) References Cited

U.S. PATENT DOCUMENTS 4,817,870 A * 4/1989 Dalton ..... 239/172
5,012,974 A * 5/1991 Johnson ..... 239/172
5,823,235 A * 10/1998 Alley et al. ..... 141/231

OTHER PUBLICATIONS

ASCO Bulletin 8320 (Undated but admitted to be prior art).*
ASCO Catalog 8320G182, p. 60 (Undated but admitted to be prior art).*
Control Chief Corporation Catalog entitled "TeleMini Tele Chief Series" (Undated but admitted to be prior art).*
ASCO Catalog, pp. 38 and 39 (Undated but admitted to be prior art).*
ASCP Bulletin 8003G and 8202G (Undated but admitted to be prior art).*
49 CFR Part 171, Hazardous Materials: Cargo Tank Motor Vehicles in Liquefied Compressed Gas Service, Interim Final Rule, Feb. 19, 1997.

* cited by examiner

*Primary Examiner*—Steven O. Douglas
(74) *Attorney, Agent, or Firm*—McAfee & Taft

(57) ABSTRACT

A delivery vehicle for delivering liquids to a storage location and a liquid delivery control system therefor. The apparatus comprises manual and remote actuation of a clutch controller for engaging and disengaging a clutch of the vehicle, remote and manual actuation of a throttle controller for opening and closing a throttle of the vehicle, actuation of a power take-off controller for engaging and disengaging a power take-off on the vehicle, and actuation of a valve controller for opening and closing an internal flow valve in a cargo tank on the vehicle. The apparatus also may include actuation of a reel controller for unwinding a liquid delivery hose from a reel and rewinding the hose on the reel. A method of delivering a liquid to a storage location is also disclosed.

86 Claims, 5 Drawing Sheets

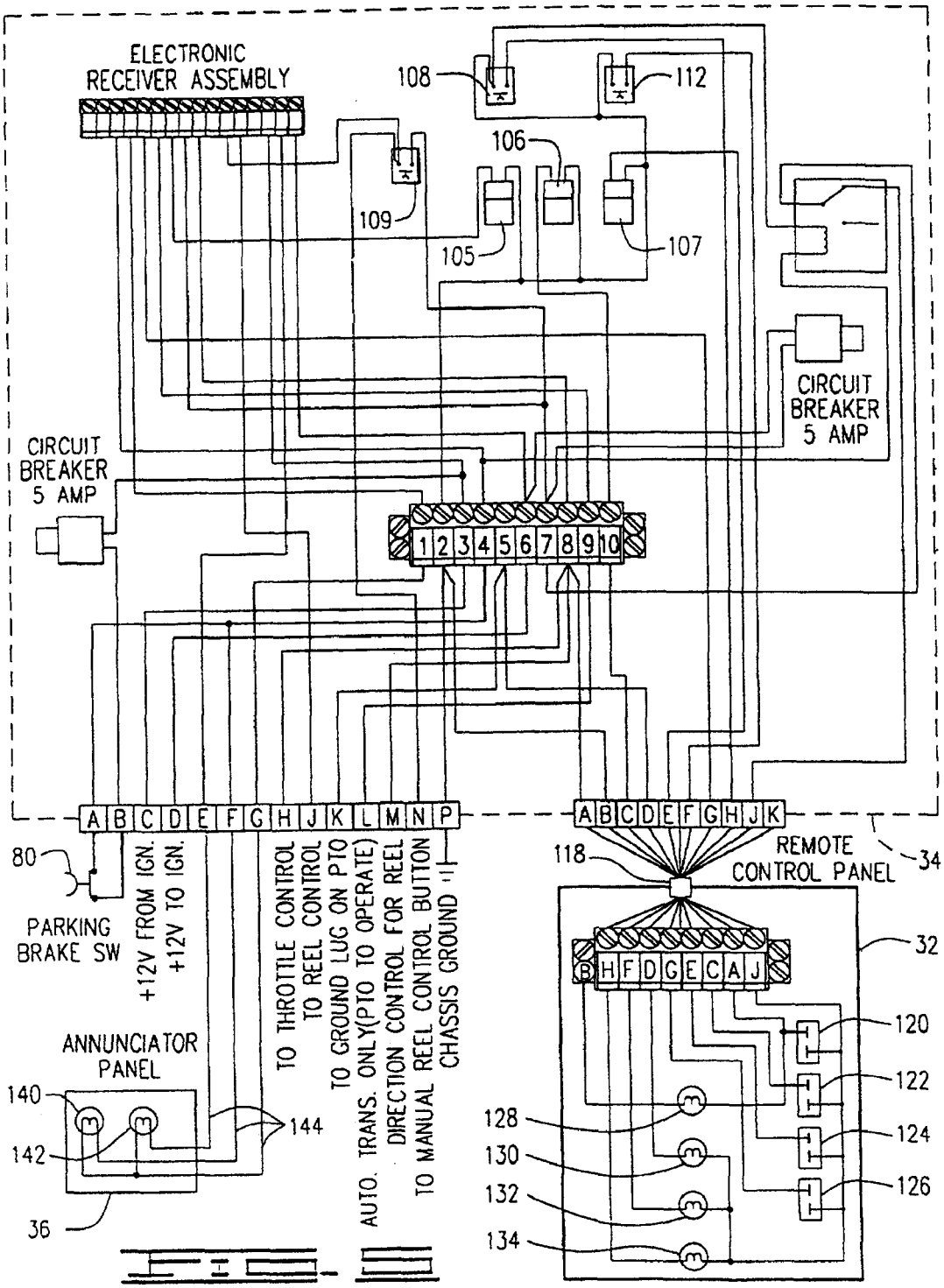
ELECTRONIC RECEIVER ASSEMBLY
108
112
106
109
105
107
CIRCUIT BREAKER 5 AMP
CIRCUIT BREAKER 5 AMP
1 2 3 4 5 6 7 8 9 10
A B C D E F G H J K L M N P
A B C D E F G H J K
80
PARKING BRAKE SW
+12V FROM IGN.
+12V TO IGN.
TO THROTTLE CONTROL
TO REEL CONTROL
TO GROUND LUG ON PTO
DIRECTION CONTROL FOR REEL
TO MANUAL REEL CONTROL BUTTON
CHASSIS GROUND
AUTO. TRANS. ONLY(PTO TO OPERATE)
118
REMOTE CONTROL PANEL
34
32
B H F D G E C A J
120
122
124
126
128
130
132
134
ANNUNCIATOR PANEL
140
142
144
36

LIQUID DELIVERY VEHICLE WITH REMOTE CONTROL SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to vehicles for delivering of liquids to a storage location, and more particularly, to a liquid delivery vehicle having a liquid delivery system which is at least partially remotely controllable.

2. Description of the Prior Art

There are many applications for the transportation of liquids by a ground vehicle for delivery to a storage location. The design and construction of such vehicles, and of the liquid delivery systems on those vehicles, vary depending upon the type of liquid being transported and delivered. In many cases, rules and regulations, both state and federal, such as United States Department of Transportation regulations, apply to the vehicles and to the delivery of liquids therefrom.

Volatile and flammable liquids, such as liquefied petroleum gases (LP gas or LPG), require very specialized equipment and careful handling. Liquefied petroleum gases, such as butane and propane, must be maintained under pressure at ambient temperatures to keep them in a liquid state. These liquids are extremely volatile; they will boil unless maintained under pressure. For example, propane boils at −44° F., and butane boils at +31° F. That is, butane and propane exist only in a gaseous state at atmospheric pressure and most ambient temperatures. In order to keep liquefied petroleum gases in a pressurized, liquid state, they must be stored in pressure vessels capable of withstanding internal pressures greater than atmospheric pressure.

Delivery vehicles for transporting and delivering liquefied petroleum gases must therefore have a pressurized tank or vessel thereon to hold the LP gas in a liquid state, and when the LP gas is delivered, it must be transferred into a similar pressurized storage tank or vessel. All of the interconnecting equipment and piping must also be designed to withstand these high internal pressures. The present invention is designed specifically to be used in an LP gas transport and delivery system, although the main components and principles of operation would also be applicable to the delivery of other liquids, including non-volatile liquids.

LP gas delivery vehicles are well known in the art, and are frequently used to deliver liquefied petroleum gas to storage vessels, particularly in rural areas. LP gases are flammable, and thus useful as fuels, and typically delivery vehicles are used to deliver the LP gas to residential storage tanks and also to larger commercial storage vessels from which the LP gas may be further distributed. LP gases are used for commercial and residential heating, motor fuels, and other applications such as heating, cooling and cooking on recreational vehicles.

In a typical LP gas delivery cycle, the driver/operator parks the vehicle at some distance spaced from the storage vessel or tank to be filled. It may be possible to park the vehicle immediately adjacent to the storage tank, but in most cases, this is not possible. Regardless of the distance, however, the general procedure for filling the storage tank is the same.

After parking the vehicle, the operator chocks the wheels so that unintended movement of the vehicle is prevented, after which the actual delivery cycle may be carried out.

These delivery vehicles typically have a flow meter, and the operator inserts a ticket into the meter which records the transaction so that the customer can be billed the appropriate amount for the volume of liquid delivered to the customer's storage tank. The operator then takes or "acquires" a delivery hose attached to the vehicle and extends the hose from the vehicle to the storage tank. A hose valve is disposed on the end of the hose along with a coupling. The coupling is attached to a mating fitting on the tank, and the hose valve is opened. The operator then returns to the delivery truck.

Back at the truck, the operator actuates control levers to open an internal flow valve on the truck which allows fluid communication between the delivery tank and a liquid transferring means, such as a pump. The operator then disengages the clutch on the vehicle, assuming the vehicle has a manual transmission, and while the clutch is disengaged, engages a power take-off. For vehicles with automatic transmissions, a control solenoid on the power take-off is actuated. The power take-off is connected to a shaft of the pump. Once the power take-off is engaged, the clutch is reengaged to allow power from the engine to drive the pump through the power take-off.

The operator then returns to the storage tank and observes the liquid fuel level on a liquid level gauge at the tank. Just before the fluid level reaches the maximum allowable amount, the driver again returns to the truck from the storage tank and stops the pump. This procedure includes disengaging the clutch and then disengaging the power takeoff. The internal flow valve in the delivery tank can then be closed.

The operator again returns to the storage tank, closes the hose valve, and disconnects the hose from the storage tank. The hose is then rewound onto its reel. At this point, the vehicle can then be driven to another location for filling another storage tank.

In this prior art procedure, three round trips by the operator from the delivery vehicle to the storage tank are required. Also, since the operator has to leave the storage tank before it is full, the amount of fluid pumped into the storage tank is only an estimate at the time the operator disengages the pump. Thus, it is possible that the storage vessel will not be completely filled. This presents a disadvantage to the provider of the LP gas of not selling as much as possible and also provides the disadvantage to the customer of not having the tank completely filled which may necessitate a shorter time between deliveries or possibly result in the customer running out of fuel. If the tank is overfilled; it may present a safety hazard.

Thus, there is a need to provide more accurate filling as a benefit to both the provider of the LP gas and to the customer. There is also a need to reduce the amount of time for each filling cycle. The present invention meets these needs by providing a liquid delivery vehicle with a remote control system so that the operator can stand at the storage tank and remotely operate the controls on the truck. This reduces the number of round trips between the delivery vehicle and the storage tank from three to one. Obviously, this saves time and makes the delivery cycle shorter and more efficient. A benefit to the provider of the LP gas is that it allows more deliveries in a given time period and also results in less operator fatigue.

[Recently implemented Department of Transportation rules [see 49 C.F.R. §171.5], require a remotely controlled emergency shut-down, or alternatively, an additional person standing at all times at arm's length from the controls at the truck. The addition of another person at the truck obviously greatly increases labor costs which is not an acceptable alternative in the great majority of cases. The present invention meets the requirements of the regulations by providing a remotely controlled emergency shut-off which substantially simultaneously stops the engine on the vehicle, disengages the power take-off and closes the internal flow valve. In addition to meeting the Department of Transportation regulations, the present invention provides a remote operation of the controls on the vehicle during a typical delivery cycle as described above.]

SUMMARY OF THE INVENTION

The present invention is a liquid delivery vehicle and a remote control system therefor for use in delivering liquids to a storage location. In particular, the illustrated embodiment of the vehicle is for use with pressurized, volatile liquids, such as liquefied petroleum gases, anhydrous ammonia, etc. The invention also includes a method of transferring liquid from a delivery vehicle to a storage location.

The control apparatus of the present invention is designed for use on a delivery vehicle of the type having a liquid tank, a flow valve in communication with the liquid tank, a pump in communication with the flow valve and a power take-off connected to the pump and a transmission of the vehicle for providing power to the pump. In the case of a manual transmission, the delivery vehicle is also of the type having a clutch for selectively connecting the power take-off to an engine of the vehicle. This control apparatus comprises clutch control means mounted on the vehicle for engaging the clutch in response to a clutch engaging signal and disengaging the clutch in response to a clutch disengaging signal, valve control means mounted on the vehicle for opening the flow valve in response to a valve opening signal and closing the flow valve in response to a valve closing signal, power take-off control means mounted on the vehicle for engaging the power take-off in response to a power take-off engaging signal and disengaging the power take-off in response to a power take-off disengaging signal, and a remote control for selectively sending at least the clutch engaging and disengaging signals to the clutch control means.

The clutch control means preferably comprises a clutch pneumatic controller connectable to an air source on the vehicle and responsive to the clutch engaging signals. The clutch control means may further comprise a clutch pressure switch in pneumatic communication with the clutch pneumatic controller and a clutch indicator light connected to the clutch pressure switch such that the clutch indicator light is illuminated when the clutch pressure switch senses air pressure applied to the clutch pneumatic controller.

The valve control means preferably comprises a valve pneumatic controller connectable to the air source on the vehicle and responsive to the valve opening and closing signals. The valve control means may further comprise a valve pressure switch in pneumatic communication with the valve pneumatic controller and a valve indicator light connected to the valve pressure switch such that the valve indicator light is illuminated when the valve pressure switch senses air pressure communicated to the valve pneumatic controller.

The power take-off control means comprises a power takeoff pneumatic controller connectable to the air source on the vehicle and responsive to the power take-off engaging and disengaging signals.

In the preferred embodiment, the clutch control means also comprises a clutch switch having a clutch engaging position for communicating the clutch engaging signal to the clutch controller and a clutch disengaging position for communicating the clutch disengaging signal to the clutch controller. The remote control can transmit the clutch disengaging signal and the clutch engaging signal to the clutch controller only when the clutch switch is in the clutch disengaging position.

The valve control means preferably also comprises a valve switch having a valve opening position for communicating the valve opening signal to the valve controller and a valve closing position for communicating the valve closing signal to the valve controller.

Similarly, the power take-off control means also comprises a power take-off switch having a power take-off engaging position for communicating the power take-off engaging signal to the power take-off controller and a power take-off disengaging signal for communicating the power take-off disengaging signal to the power take-off controller.

The control apparatus may further comprise throttle control means for opening an engine throttle of the vehicle in response to a throttle opening signal and closing the throttle in response to a throttle closing signal. The remote control may be adapted for transmitting the throttle opening and closing signals. The throttle control means preferably comprises a throttle controller connectable to an electrical source on the vehicle and responsive to the throttle opening and closing signals. The throttle control means may also comprise a throttle switch having a throttle opening and closing position. The remote control can transmit the throttle closing signal and the throttle opening signal to the throttle controller when the throttle switch is in the throttle closing position only.

In some embodiments, the delivery vehicle may also be of a type having a hose in communication with the flow valve, a reel for the hose, and a motor for rotating the reel so that the hose may be wound and unwound therefrom. The terms "winding" and "rewinding" are used interchangeably herein. Preferably, the remote control is also adapted for selectively sending a hose reel winding or rewinding signal to the reel such that the reel rotates in a direction for winding or rewinding the hose thereon when the clutch disengaging signal is communicated to the clutch control means and the throttle closing signal is communicated to the throttle control means, a hose reel unwinding signal such that the reel is rotated in a direction for unwinding the hose therefrom when the clutch disengaging signal is communicated to the clutch control means and the throttle opening signal is communicated to the throttle control means, and a hose reel stop signal to stop winding and unwinding of the reel. The reel will only rotate in a winding or rewinding direction when the clutch disengaging signal is sent to the clutch control means and the throttle closing signal is sent to the throttle control means. The hose will only rotate in an unwinding direction when the clutch disengaging signal is sent to the clutch control means and the throttle opening signal is sent to the throttle control means. The clutch control means may further comprise another clutch pressure switch in pneumatic communication with the clutch pneumatic controller and connected to the reel motor such that the reel motor will rotate only when this other clutch pressure switch senses air pressure communicated to the clutch pneumatic controller.

The control apparatus may further comprise emergency shutdown means for substantially simultaneously shutting off the engine of the vehicle, closing the flow valve and disengaging the power take-off in response to a shutdown signal. The remote control is preferably adapted for transmitting this shutdown signal. The shutdown signal may comprise an engine stop signal, the valve closing signal and the power take-off disengaging signal.

Stated in another way, the present invention is characterized by a delivery vehicle for transporting liquid and delivering the liquid to a storage location. The vehicle comprises a rolling chassis having a plurality of wheels thereon including a plurality of drive wheels, an engine on the chassis, a transmission connected to the engine and adapted for transmitting power from the engine to the drive wheels, a cargo tank mounted on the chassis for holding a quantity of the liquid, a flow valve in communication with the cargo tank, fluid transferring means having an inlet in communication with the flow valve and an outlet for transferring liquid from the cargo tank, a delivery hose in communication with the outlet of the fluid transferring means and having an end adapted for connection to the storage location, a power take-off on the transmission and connected to the fluid transferring means such that the power take-off has an engaged position wherein power from the engine is transferred to the fluid transferring means and a disengaged position disengaged from the engine thereby preventing transfer of power from the engine to the fluid transferring means, a transmission controller for engaging the transmission in response to a transmission engaging signal and disengaging the transmission in response to a transmission disengaging signal, a valve controller for opening the flow valve in response to a valve opening signal and closing the valve in response to a valve closing signal, a power take-off controller for engaging the power take-off in response to a power take-off engaging signal and disengaging the power take-off in response to a power take-off disengaging signal, and a remote controller for selectively transmitting at least the transmission engaging and disengaging signals.

In such a delivery vehicle wherein the transmission is a manual transmission comprising a clutch, the transmission controller comprises a clutch controller, the transmission engaging signal is a clutch engaging signal sent to the clutch controller and the transmission disengaging signal is a clutch disengaging signal sent to the clutch controller. The clutch controller comprises a manual switch having clutch engaging and disengaging positions, and the remote control can transmit the clutch engaging and disengaging signals only when the switch is in the disengaging position.

Some delivery vehicles have an automatic transmission. In these automatic transmissions, the power take-off is part of the transmission and is known as a "hot shift" PTO. Hydraulic clutches in the transmission are engaged and disengaged to drive the power take-off output shaft. Such an automatic transmission power take-off output shaft would be connected to the fluid transferring means in the same manner as the manual transmission power take-off configuration. A solenoid is in fluid communication with the hydraulic clutches and supplies fluid thereto when actuated. The solenoid thus may be considered the automatic transmission embodiment of the transmission controller. In this case, the transmission engaging signal and the power take-off engaging signal are the same and may be transmitted by the remote controller.

The valve controller comprises a manual switch having valve opening and closing positions, and the remote control can transmit the valve closing signal when the switch is in the opening position. The power take-off controller also comprises a manual switch having power take-off engaging and disengaging positions, and the remote control can transmit the power take-off disengaging signal when the switch is in the power take-off engaging position.

The vehicle may further comprise a throttle controller for opening a throttle of the engine in response to a throttle opening signal and closing the throttle in response to a throttle closing signal, and the remote control can transmit the throttle opening and closing signals. The throttle controller comprises a manual switch having throttle opening and closing positions, and the remote control can transmit the throttle opening and closing signals when the switch is in the throttle closing position only.

The vehicle may further comprise a reel on which the hose may be wound for storage and a reel controller for winding the hose onto the reel in response to a reel winding signal, unwinding the hose from the reel in response to a reel unwinding signal and stopping the reel in response to a reel stop signal. The remote control can transmit the reel winding signal, the reel unwinding signal and the reel stop signal.

The fluid transferring means comprises a pump having a shaft connected to and driven by the power take-off.

The present invention also includes a method of delivering liquid from a delivery vehicle to a storage location and comprising the steps of opening a flow valve in communication with a tank of the vehicle so that the tank is placed in communication with a pump on the vehicle, disengaging a clutch on the vehicle, engaging a power take-off on the vehicle so that power from an engine on the vehicle may be transferred to the pump when the clutch is engaged, extending a delivery hose from the vehicle, connecting a hose valve on an end of the hose to the storage vessel, opening the hose valve, remotely engaging the clutch so that power is transferred to the pump and liquid is pumped out of the tank and through the delivery hose into the storage vessel, remotely disengaging the clutch when a quantity of liquid in the storage vessel reaches a desired level, closing the hose valve, disconnecting the delivery hose from the storage vessel, and returning the delivery hose to the vehicle.

The method may also comprise, after the step of remotely engaging the clutch, remotely opening a throttle of the vehicle to increase the speed of the power take-off and pump. After liquid has been pumped, the method may also comprise the step of remotely closing the throttle.

The step of extending the delivery hose may comprise unwinding the delivery hose from a reel on the vehicle. If the reel is a powered reel, this step may further comprise remotely actuating the reel to unwind the delivery hose therefrom. Prior to this step of remotely actuating the reel, the method may further comprise the step of remotely opening a throttle of the vehicle to increase the speed of the engine. In such a case, the step of returning the delivery hose to the vehicle may comprise remotely actuating the reel to rewind the delivery hose thereon. Prior to the step of remotely actuating the reel to rewind the delivery hose, the method may further comprise the step of remotely closing the throttle of the vehicle to decrease the speed of the engine.

In an emergency situation, the method may further comprise remotely disengaging the power take-off, remotely closing the flow valve and/or remotely stopping the engine.

Numerous objects and advantages of the invention will become apparent as the following detailed description of the preferred embodiment is read in conjunction with the drawings which illustrate such embodiment.

BRIEF DESCRIPTION OF THE DRAWINGS

FIG. 6 shows a wiring schematic of a hose reel control panel of the control system.

DESCRIPTION OF THE PREFERRED EMBODIMENTS

Figure 1:
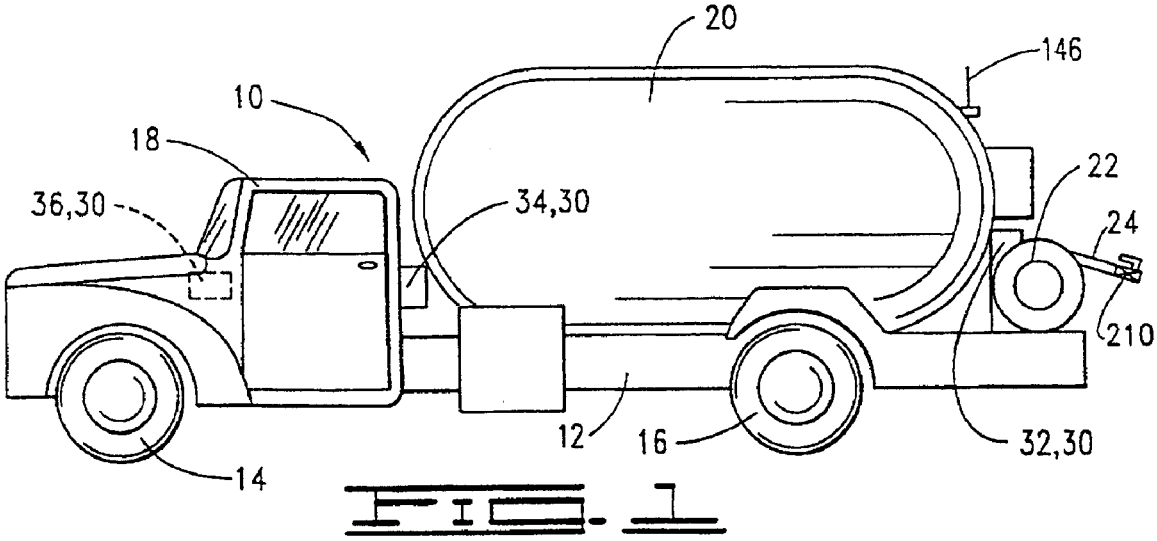
FIG. 1 illustrates a side view of the liquid delivery vehicle with remote control system of the present invention.
Figure 2:
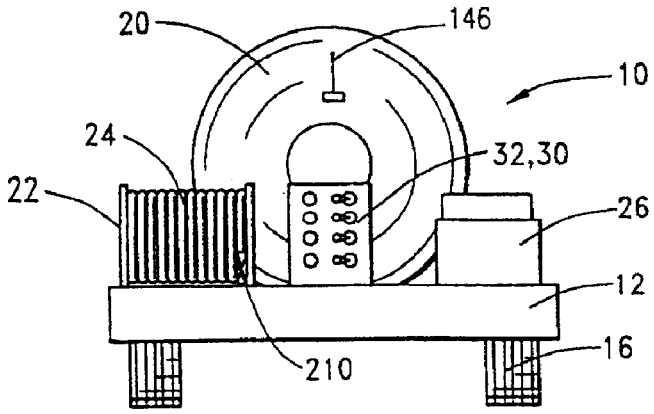
FIG. 2 shows a rear elevation of the vehicle.

Referring now to the drawings, and more particularly to FIGS. 1 and 2, the liquid delivery vehicle with remote control system of the present invention is shown and generally designated by the numeral 10. Vehicle 10 as described herein is designed for use with volatile liquids, such as liquefied petroleum gases, anhydrous ammonia, etc. However, the vehicle and the control system for liquid delivery from the vehicle which are described herein are also adaptable to the delivery of non-volatile liquids.

Vehicle 10 as illustrated is a "bobtail" truck. Such a vehicle has a rolling chassis 12 supported on front wheels 14 and rear drive wheels 16 with a cab 18 at the forward end of the chassis. This portion of vehicle 10 and the drive train thereof are normally purchased from a dealer for a motor vehicle manufacturer. The remaining components which make up delivery vehicle 10 are added by a fabricator, such as the assignee of the present invention.

Liquid is carried on vehicle 10 in a delivery or cargo vessel or tank 20 which is mounted on chassis 12. In volatile liquid applications, delivery tank 20 is a pressure vessel in which the liquid can be stored under pressure. Delivery tank 20 has a variety of gauges, relief valves, piping and other components in communication therewith which are well known in the art and, for simplicity, are not shown in FIGS. 1 and 2. Major components shown in FIGS. 1 and 2 include a hose reel 22 with a delivery hose 24 wrapped thereon and a meter 26 which measures and records the amount of liquid pumped out of delivery tank 20 during a delivery cycle, as will be further described herein. Hose reel 22 is of a kind known in the art such as manufactured by Hannay or Nordic, and meter 26 is also known in the art, such as Neptune Model 40.

The control system of the present invention for delivery vehicle 10 is generally designated by the numeral 30. The major components of control system 30 are a remote control panel 32, a main control panel 34 and an annunciator panel 36. Remote control panel 32 is preferably mounted at the rear of vehicle 10. Main control panel 34 is preferably mounted at a location near the rear of cab 18 of vehicle 10. Annunciator panel 36 is designed to be mounted under the dash within cab 18. However, it should be understood that each of these components may be mounted in a variety of locations on vehicle 10, and the invention is not limited to any particular location or configuration.

Figure 3:
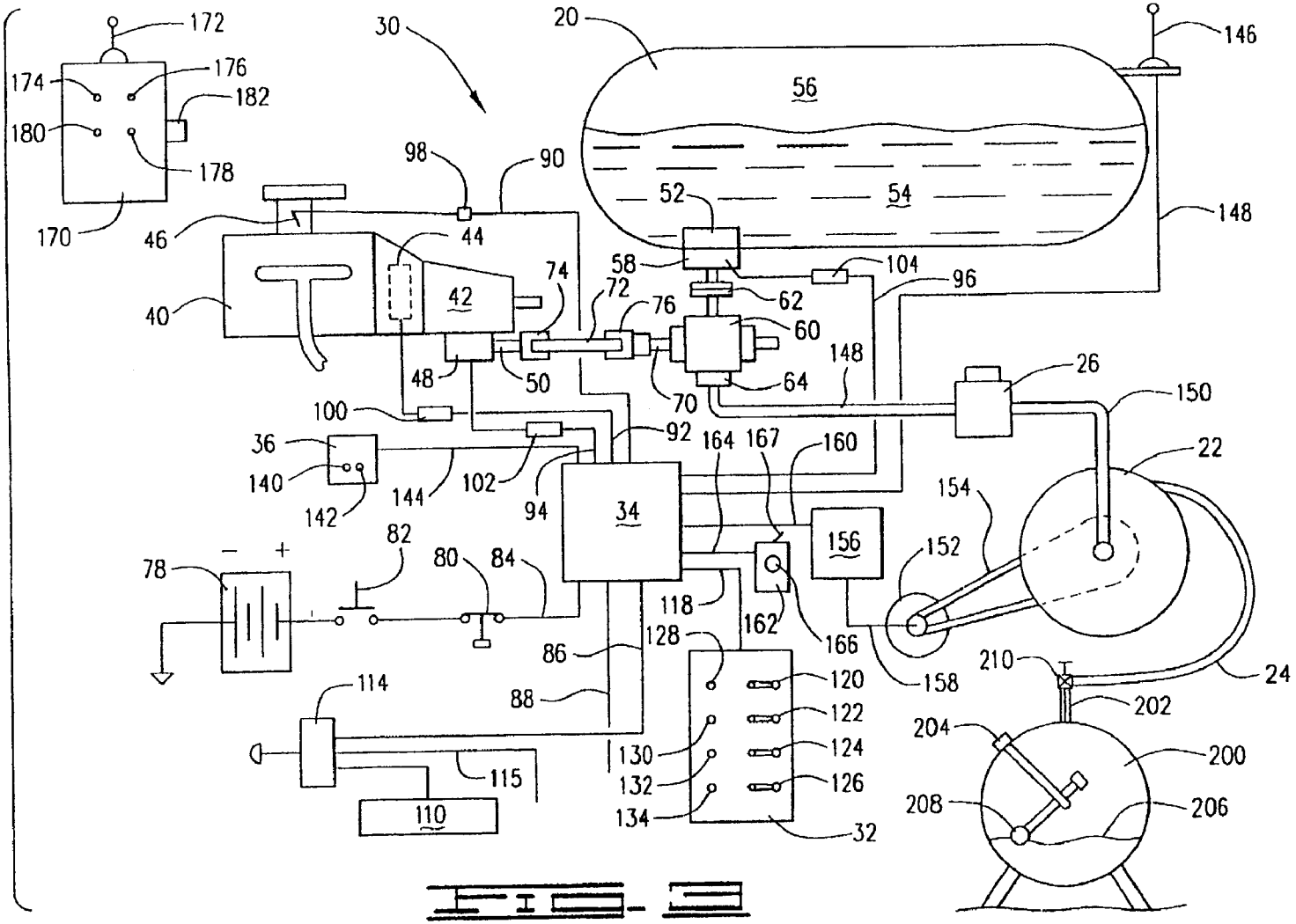
FIG. 3 is a piping and control schematic of the delivery vehicle in operation during filling of a storage vessel.

Referring now to FIG. 3, the details of control system 30 and additional components of delivery vehicle 10 will be described.

The drive train of vehicle 10, of course, includes an engine 40 which delivers power to rear wheels 16 through a transmission 42. If transmission 42 is a manual transmission, it includes a clutch 44. Engine 40 has a throttle 46 which controls the flow of fuel to the engine, and thus the speed of the engine, in a well known manner.

Attached to transmission 42 is a power take-off 48 which, when engaged, transmits power from engine 40 to a power take-off shaft 50, again in a known manner.

An internal flow valve 52 is mounted on the lower side of delivery tank 20. As can be seen in FIG. 3, a portion of internal flow valve 52 extends into liquid section 54 in delivery tank 20 which is below a vapor section 56. Internal flow valve 52 is attached to and extends partially through a flange 58 which is integral to the lower side of delivery tank 20.

A pump 60 is attached to internal flow valve 52 by an inlet flange 62 which is in communication with the internal flow valve. Pump 60 also has an outlet 64.

Internal flow valve 52 is of a kind known in the art, such as a Fisher Model C403-24, and is adapted to be opened in response to pressure applied thereto. Also, internal flow valve 52 acts as an excess flow valve which will close automatically in the event of an accident which may shear pump 60 away from vehicle 10. This feature of internal flow valve 52 is designed to try to control dangerous situations, such as the undesired escape of liquid from delivery tank 20 which can be quite hazardous for volatile liquids, particularly when they are flammable such as liquefied petroleum gases.

Pump 60 is also of a kind known in the art. A typical pump 60 is a rotary, sliding vane pump, such as the Corken Model Z3200 which has a rotatable pump shaft 70 extending therefrom. Pump shaft 70 is preferably substantially parallel to power take-off shaft 50.

A drive shaft 72 extends between power take-off shaft 50 and pump shaft 70 and is connected to the power take-off shaft and pump shaft by universal joints 74 and 76, respectively. Thus, when power take-off shaft 50 is rotated by the engagement of power take-off 48, pump shaft 70 is rotated through drive shaft 72 and universal joints 74 and 76 so that liquid may be pumped out of delivery tank 20 through internal flow valve 52.

Main control panel 34 is electrically connected to vehicle battery 78 by a pressure switch 80 and ignition switch 82. Pressure switch 90 is connected to the vehicle parking brake (not shown). When the parking brake is set or activated, and when ignition switch 82 of vehicle 10 is closed, pressure switch 80 is closed so that power is supplied to main control panel 34 of control system 30 through cable 84. In other words, unless the parking brake on vehicle 10 is set and ignition switch 82 is on, control system 30 is deactivated.

Main control panel 34 is adapted for connection to an electrical line 90 and a plurality of pneumatic lines 86, 88, 92, 94 and 96. Electric line 90 is connected to a throttle controller 98 which is connected to throttle 46 on engine 40. Pneumatic line 92 is connected to a pneumatic clutch or transmission controller 100 which is connected to clutch 44. Pneumatic line 94 is connected to a pneumatic power take-off controller 102 which in turn is connected to power take-off 48. Pneumatic line 96 is connected to a pneumatic internal flow valve controller 104 which is connected to internal flow valve 52.

Figure 4:
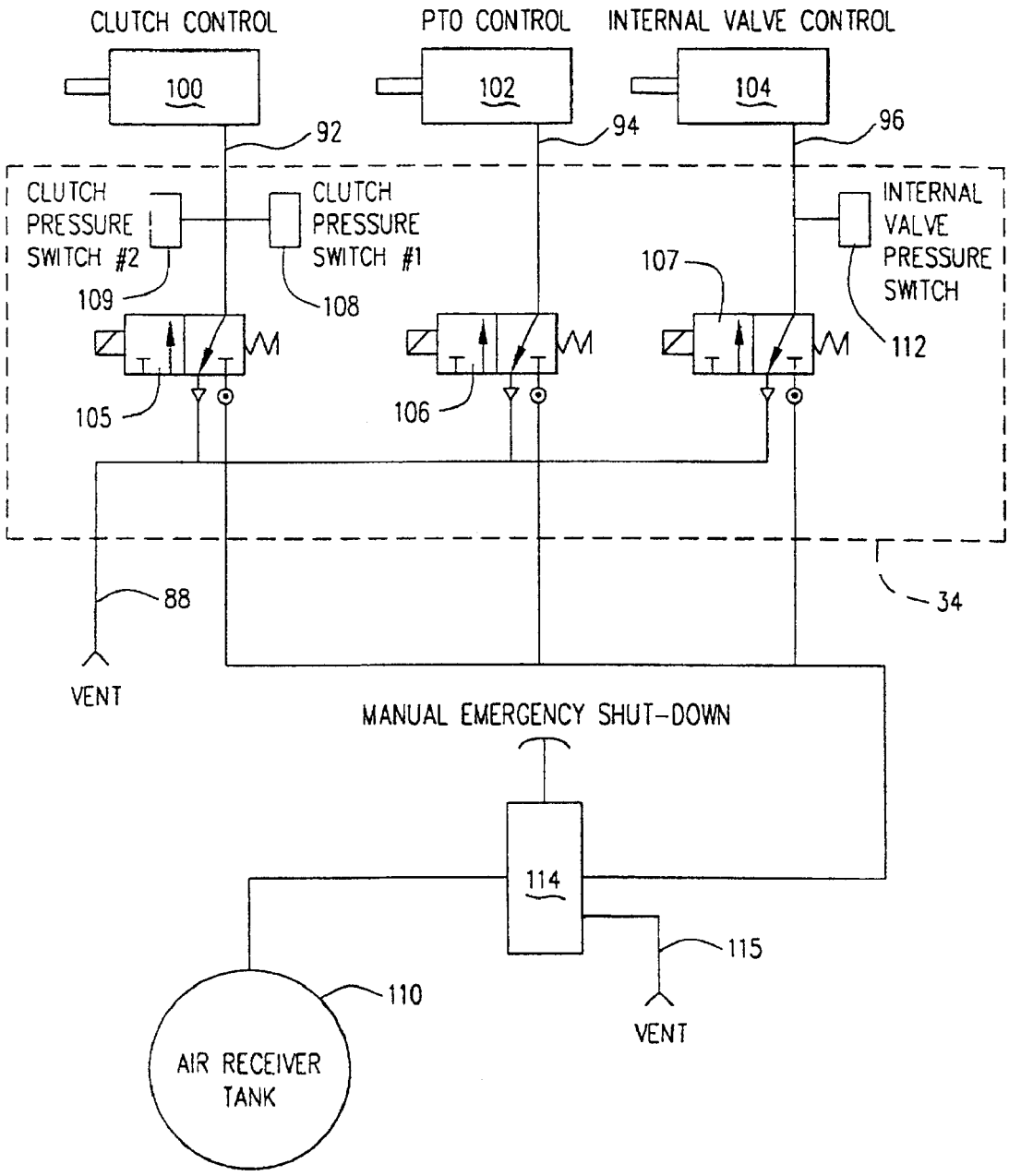
FIG. 4 illustrates a detailed pneumatic schematic of the control system.

Referring now to FIG. 4, in which a pneumatic schematic is shown, disposed inside main control panel 34 are a clutch solenoid 105, a power take-off solenoid 106 and an internal flow valve solenoid 107. Clutch solenoid 105 is disposed in pneumatic line 92 and controls the supply of air to clutch controller 100. Power take-off solenoid 106 is disposed in pneumatic line 94 and controls the supply of air to power take-off controller 102. Valve solenoid 107 is disposed in pneumatic line 96 and controls the supply of air to valve controller 104. When any of solenoids 105, 106 or 107 is actuated, air is communicated to the corresponding controller. When any of solenoids 105, 106 or 107 is deactuated, air in the corresponding pneumatic line is vented through vent line 88.

A first clutch pressure switch 108 and a second clutch pressure switch 109 are in communication with pneumatic line 92 and are adapted for sensing pressure in pneumatic line 92. First clutch pressure switch 108 is a feedback switch which, when pressure is sensed in pneumatic line 92, provides electrical power to a clutch indicator light 134 in remote control panel 32 as will be further described herein. Second clutch pressure switch 109 is connected to a hose reel control panel 156 as will be further described herein. Valve pressure switch 112 is a feedback switch which provides electrical power to a valve indicator light 132 in remote control panel 34, as further described herein, when pressure is sensed in pneumatic line 96.

Pneumatic line 86 connects main control panel 34 to an air source 110 which is usually the same as that used to actuate the brakes on vehicle 10.

A manual emergency shutdown 114 is provided in pneumatic line 86 so that the air supply to main control panel 34 may be shut off quickly if necessary. When this occurs, air is vented out of a vent line 115. This will result in clutch controller 100, power take-off controller 102 and valve controller 104 being substantially simultaneously disconnected from air supply 110.

Pneumatic line 88 vents to the atmosphere and thus may be referred to as vent line 88.

Remote control panel 32 is electrically connected to main control panel 34 by a cable 118. Mounted on remote control panel 32 are a throttle switch 120 connected to throttle controller 98, a power take-off switch 122 connected to power take-off solenoid 106, an internal flow valve switch 124 connected to internal flow valve solenoid 107 and a clutch switch 126 connected to clutch solenoid 105.

Actuation of throttle switch 120 selectively sends a throttle opening and closing signal to throttle controller 98. Actuation of power take-off switch 122 selectively sends a power take-off engaging or disengaging signal to power take-off controller 102. Actuation of internal flow valve switch 124 selectively sends a valve opening or closing signal to valve controller 104. Actuation of clutch switch 126 selectively sends a clutch engaging or disengaging signal to clutch controller 100.

Also mounted on remote control panel 32 are a throttle indicator light 128 which is illuminated when throttle switch 120 is actuated, a power take-off indicator light 130 which is illuminated when power take-off switch 122 is actuated and power take-off 48 is engaged, previously mentioned internal flow valve indicator light 132 which is illuminated when internal flow valve switch 124 is actuated and internal flow valve pressure switch 112 senses air pressure in pneumatic line 96, and previously mentioned clutch indicator light which is illuminated when clutch switch 126 is actuated and first clutch pressure switch 108 senses air pressure in pneumatic line 92.

Figure 5:
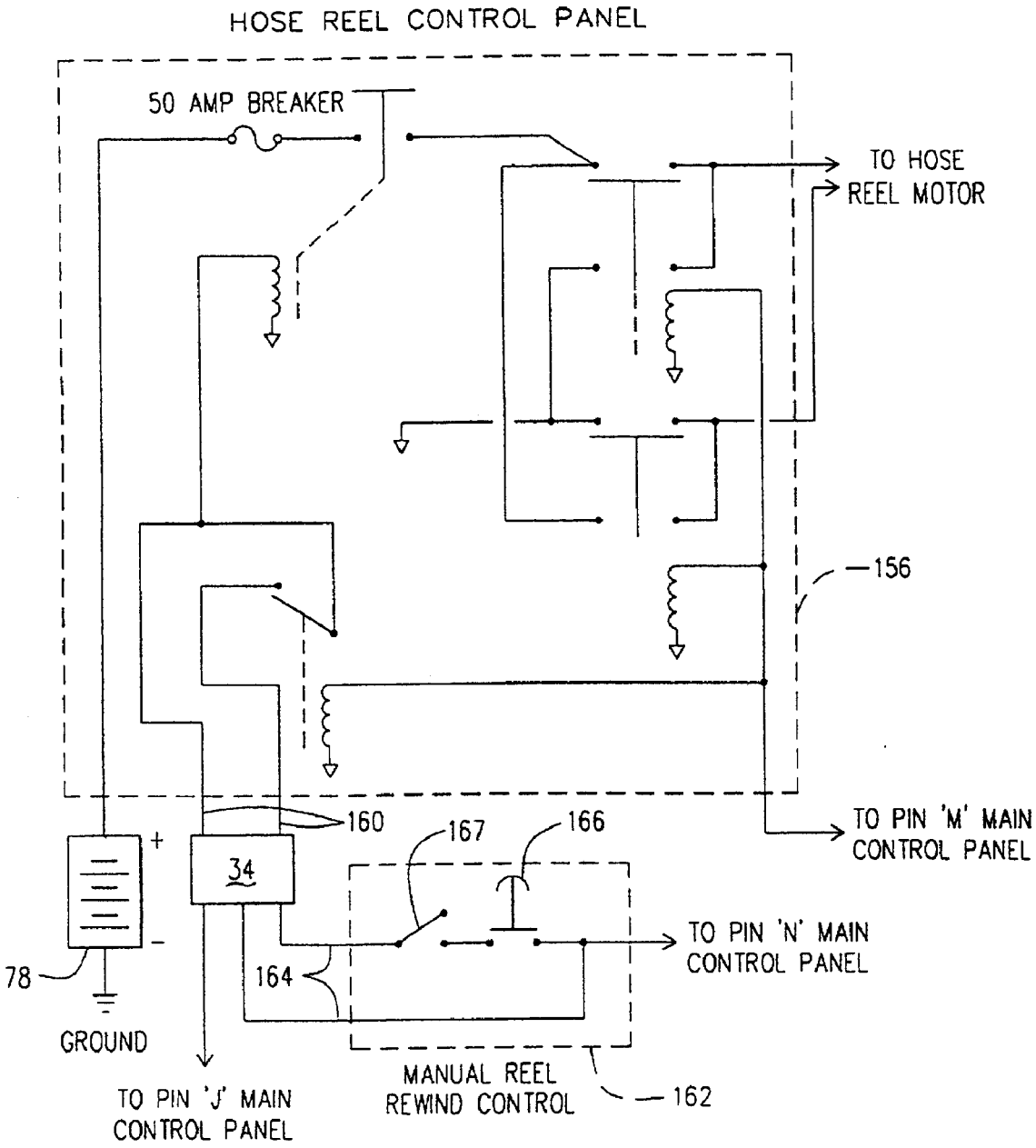
FIG. 5 is a wiring schematic of the main control panel and remote control panel of the control system.

Switches 120, 122, 124 and 126 and indicator lights 128, 130, 132 and 134 are connected to main control panel 34 by cable 118. See also the electrical schematic in FIG. 5 which will be understood by those skilled in the art.

Actuation of throttle switch 120 allows manual actuation of throttle controller 98, actuation of power take-off switch 122 allows manual actuation of power take-off controller 102, internal flow valve switch 124 allows manual control of internal flow valve controller 104, and clutch switch 126 allows manual control of clutch controller 100. Thus, an operator can stand at the rear of vehicle 10 adjacent to remote control panel 32 and actuate the corresponding switches 120, 122, 124 and 126 to open and close throttle 46, engage and disengage clutch 44, engage and disengage power take-off 48 and open and close internal flow valve 52.

Annunciator panel 36 located in cab 18 of vehicle 10 has a power indicator light 140 and an emergency shutdown indicator light 142. Annunciator panel 36 is connected to main control panel 34 by a cable 144. See FIGS. 3 and 5. Any time power is provided to main control panel 34, power indicator light 140 is illuminated. In the event of an emergency shutdown, emergency shutdown indicator light 142 is illuminated so that the operator can see that the emergency shutdown has been actuated.

An antenna 146 is connected to main control panel 34 by an antenna cable 148. As seen in FIGS. 1–3, antenna 146 is preferably located at an upper rear portion of vehicle 10, such as on delivery tank 20.

Discharge 64 of pump 60 is connected to meter 26 by a pump discharge line 148. Meter 26 is in communication with hose 24 on hose reel 22 through another liquid line 150.

In one preferred embodiment, hose reel 22 is a powered hose reel driven by an electric hose reel motor 152. Reel motor 152 is connected to hose reel 22 by any drive means known in the art, such as a chain drive 154.

Reel motor 152 is connected to a hose reel control panel 156 by a cable 158, and the hose reel control panel is connected to main control panel 34 by another cable 160. See FIG. 5 and also see the electrical schematic of FIG. 6 which will be understood by those skilled in the art. A reel rewind controller 162 is connected to main control panel 34 by a cable 164. Reel rewind controller 162 is adapted to actuate hose reel control panel 156 and thus reel motor 152 by depressing a manual rewind button 166. Manual rewind button 166 is a "dead-man" type which only actuates reel motor 152 when depressed. In the event of failure of manual rewind button 166, reel rewind controller 162 includes an emergency stop switch 167. Reel rewind controller 162 may only be used to rewind hose 24 onto hose reel 22 and not to unwind the hose and only when clutch controller 100 is activated, that is, when second clutch pressure switch 109 senses air pressure in pneumatic line 92.

A hand-held remote controller 170 may be used by the operator during a delivery cycle to provide remote control of control system 30. In the illustrated embodiment, remote controller 170 has a radio transmitter (not shown) which sends signals through an antenna 172 to antenna 146 on vehicle 10 and thus to main control panel 34. Antenna 172 may be internal within remote controller 170. Remote controller 170 has a remote clutch button 174, a remote throttle button 176, and a remote emergency shutdown button 178.

If delivery vehicle 10 has a powered hose reel 22 driven by reel motor 152, remote controller 170 may also have a remote reel button 180. Normally, hose reel control panel 156 signals hose reel motor 152 to be in condition for rotating in a rewinding position. When throttle controller 98 is actuated to a throttle opening position, hose reel control panel 156 signals hose reel motor 152 to be in condition for rotating in an unwinding direction. Manual rewind button 166 is inactive when throttle controller 98 is thus engaged, and actuation of reel motor 152 may only occur in this case when remote reel button 180 on remote controller 170 is pushed. Remote reel button 180 is a "dead-man" type button which only sends a rewinding or unwinding signal to reel motor 152 when the button is depressed. Releasing the button will break the connection and stop the signal, which essentially act as a stop signal to reel motor 152. When throttle controller 98 is not so engaged, and reel motor 152 is in a rewind condition, depressing remote reel button 180 on remote controller 170 will cause reel motor 152 to rotate in the rewind direction. Again, releasing remote reel button 180 will cause reel motor 152 to stop.

An indicator light 182 may also be provided on remote controller 170 which flashes each time any of buttons 174, 176, 178 or 180 is pushed. This allows the operator to know that the corresponding button has been properly actuated.

If delivery vehicle 10 has an automatic transmission, power take-off 48 is part of the transmission and is known as a "hot shift" power take-off. "Hot shift" power take-off 48 and the automatic transmission have internal clutches (not shown) which engage and disengage the power take-off. In this automatic transmission configuration, there is no pneumatic power take-off controller 102. Instead, clutch controller 100 is an automatic transmission controller characterized by a solenoid which supplies hydraulic fluid to the internal clutches when the solenoid is engaged. Thus, in operation, the engagement of "hot shift" power take-off 48 on the automatic transmission is controlled by activating either clutch switch 126 on remote control panel 32 or remote clutch button 174 on remote controller 170. Power take-off switch 122 on remote control panel 32 is deactivated. Other than these changes, the operation of control system 30 with an automatic transmission is the same as previously described.

OPERATION OF THE INVENTION

In operation, delivery vehicle 10 is parked at a convenient location with respect to a stationary storage vessel or tank 200 to be filled. Storage tank 200 may be of any kind known in the art, such as a residential LP gas storage tank. The operator of delivery vehicle 10 will generally park the vehicle as near to storage tank 200 as possible, although this may not be particularly close.

Storage tank 200 has a fill connector 202 in communication therewith. Storage tank 200 also has a liquid level gauge 204 which shows the approximate liquid level 206 in storage tank 200. Typically, liquid level gauge 204 is a known mechanical device having a float 208 extending into storage tank 200 and which floats on the surface of the liquid in the tank. Float 208 is connected to a needle (not shown) on the external portion of liquid level gauge so that the operator can see the level in storage tank 200 when standing adjacent thereto.

When delivery vehicle 10 is positioned as desired, the parking brake is set which actuates pressure switch 80 to allow power to be communicated to main control panel 34 of control system 30, assuming ignition switch 82 is on. The operator exits the vehicle and chocks the wheels so that the vehicle cannot inadvertently roll.

The operator then moves to the rear of vehicle 10 and inserts a delivery ticket (not shown) into meter 26 in a manner known in the art. This starts the actual delivery process, and when done, the total amount of liquid delivered to storage tank 200 will be printed on the delivery ticket.

The operator then actuates clutch switch 126 on remote control panel 32 which sends a clutch disengaging signal to clutch controller 100 to disengage clutch 44. Next, the operator actuates internal flow valve switch 124 which sends a valve opening signal to valve controller 104 to open internal flow valve 52, thereby communicating liquid from delivery tank 20 with pump 60. The operator then actuates power take-off switch 122 which sends a power take-off engaging signal to power take-off controller 102 to engage power take-off 48 so that power may be applied to pump 60 when clutch 44 is re-engaged.

At this point, the operator can acquire and extend hose 24. Normally, this is accomplished by grasping a hose valve 210 which is on the end of hose 24. If reel 22 is a manual reel, the operator extends hose 24 by simply pulling it away from vehicle 10. If reel 22 is powered by a motor, such as reel motor 152, the operator may push remote throttle button 176 which signals hose reel control panel 156 to reverse the direction of hose reel motor 152. Then the operator pushes and holds remote reel button 180 on remote controller 170 to send a reel unwinding signal to hose reel controller 156 and reel motor 152, thereby causing the reel motor to rotate so that hose 24 is unwound from reel 22. The operator knows when remote reel button 180 can be pushed to unwind hose 24 by hearing engine 40 on vehicle 10 speed up because throttle controller 98 has been actuated to open throttle 46. Again, remote reel button 180 and manual rewind button 166 are of the "dead-man" type such that a constant pressure must be applied to these buttons for hose reel motor 152 to operate, but manual rewind button 166 is deactivated when throttle 46 is open. Releasing remote reel button 180 or manual rewind button 166 will result in the deactivation of reel motor 152.

As the hose unwinds, the operator merely walks away from vehicle 10 holding the end of hose 24 until sufficient length of hose has been extended to reach storage tank 200, at which point the operator must release remote reel button 180 on remote controller 170. This sends a reel stop signal (an interruption or cessation of the reel unwinding signal) to hose reel controller 156 and reel motor 152 to stop the rotation of the reel motor. When unwinding is completed, the operator may press remote throttle button 176 again to send the throttle closing signal to throttle controller 98 which results in the engine being slowed back down to idle speed.

When sufficient length of hose 24 has been extended from delivery vehicle 10, hose valve 210 is engaged with connector 202 on storage tank 200. This connection is of a kind known in the art, and, for simplicity, details are not shown herein. Fluid communication is provided between delivery tank 20 and storage tank 200 by opening hose valve 210. At this point, the operator engages remote clutch button 174 which sends a clutch engaging signal to clutch controller 100 to re-engage clutch 44 so that power is transmitted through power take-off 48 to pump 60. It should be noted that clutch 44 is thus re-engaged even though clutch switch 126 on remote control panel 32 is in the disengaging position thereof.

With pump 60 thus powered by power take-off 48, liquid is pumped out of delivery tank 20 through internal flow valve 52 and discharged out of pump 60 through line 148, meter 26, line 150, hose 24 and hose valve 210 into storage tank 200. If desired, the operator may push remote throttle button 176 to send a throttle opening signal to throttle controller 98, thereby opening throttle 46 to increase the speed of engine 40. It should be noted that this throttle opening signal may be sent to throttle controller 98 only when throttle switch 120 on remote control panel 32 is in the throttle closed position. The remote opening of throttle 46 results in increased speed of power take-off 48 and pump 60 so that the pumping rate of liquid out of delivery tank 20 is increased.

During the filling operation, the operator observes the level 206 of liquid in storage tank 200 by viewing liquid level gauge 204. When liquid level 206 reaches the desired amount, the operator pushes remote throttle button 176 to send a throttle closing signal to throttle controller 98, thereby slowing down engine 40 and pump 60, and also pushes remote clutch button 174 to send a clutch disengaging signal to clutch controller 100 to disengage clutch 44, thereby stopping power take-off 48 and pump 60.

At this point, the operator then closes hose valve 210 and disconnects it from connector 202 on storage tank 200.

If reel 22 is manually operated, the operator must manually rewind hose 24 on the reel. However, if reel 22 is powered by reel motor 152, the operator may once again push and hold remote reel button 180 on remote controller 170 to send a reel rewind signal to reel rewind controller 162 and reel motor 152 so that hose 24 is automatically rewound on reel 22. All the operator has to do at this point is "walk" hose 24 back toward delivery vehicle 10. To stop rewinding at any time, the operator simply releases remote reel button 180 on remote controller 170 to send a reel stop signal (an interruption or cessation of the reel rewinding signal) to hose reel controller 156 and reel motor 152 to stop the rotation of the reel motor.

It will be seen that control system 30 for liquid delivery vehicle 10 thus provides an easily used, remote control of the system, and requires only a single trip from delivery vehicle 10 to storage tank 200 and back for a complete filling operation. This is a great improvement over the prior art previously described in which three such round trips are necessary.

To minimize the possibilities of dangerous situations and to comply with the above-mentioned Department of Transportation regulations, remote controller 170 has remote shutdown button 178 therein which, when pushed, remotely shuts down control system 30 completely. When remote shutdown button 160 is pushed, an engine shutdown signal is sent to the ignition of engine 40 on vehicle 10 so that the engine is stopped, a valve closing signal is sent to internal flow valve controller 104 so that internal flow control valve 52 is closed, and a power take-off disengaging signal is sent to power take-off controller 102 so that power take-off 48 is disengaged. In this way, pump 60 is shut off, and no liquid may flow from delivery tank 20 because internal flow valve 52 is closed. Shutdown indicator light 142 on annunciator panel 36 is illuminated.

It will be seen, therefore, that the delivery vehicle with remote control system of the present invention is well adapted to carry out the ends and advantages mentioned, as well as those inherent therein. While a preferred embodiment of the apparatus and method of use are described for the purposes of this disclosure, numerous changes in the arrangement and construction of parts in the apparatus and steps in the method may be made by those skilled in the art. All such changes are encompassed within the scope and spirit of the appended claims.

What is claimed is:

1. A control apparatus for use on a liquid delivery vehicle of the type having a liquid tank, a flow valve in communication with the liquid tank, a pump in communication with the flow valve, a power take-off connected to the pump for providing power thereto, a clutch for selectively connecting the power take-off to an engine of the vehicle, said apparatus comprising:

clutch control means mounted on the vehicle for engaging the clutch in response to a clutch engaging signal and disengaging the clutch in response to a clutch disengaging signal;

valve control means mounted on the vehicle for opening the flow valve in response to a valve opening signal and closing the flow valve in response to a valve closing signal;

power take-off control means mounted on the vehicle for engaging the power take-off in response to a power takeoff engaging signal and disengaging the power take-off in response to a power take-off disengaging signal; and a remote control for selectively sending said clutch engaging and disengaging signals to said clutch control means.

2. The apparatus of claim 1 wherein said clutch control means comprises a clutch pneumatic controller connectable to an air source on the vehicle and responsive to said clutch engaging and disengaging signals.

3. The apparatus of claim 2 wherein:

said clutch control means further comprises:

a clutch pressure switch in pneumatic communication with said clutch pneumatic controller; and a clutch indicator light connected to said clutch pressure switch such that said clutch indicator light is illuminated when said clutch pressure switch senses air pressure applied to said clutch pneumatic controller.

4. The apparatus of claim 1 wherein said valve control means comprises a valve pneumatic controller connectable to an air source on the vehicle and responsive to said valve opening and closing signals.

5. The apparatus of claim 4 wherein:

said valve control means further comprises:

a valve pressure switch in pneumatic communication with said valve pneumatic controller; and a valve indicator light connected to said valve pressure switch such that said valve indicator light is illuminated when said valve pressure switch senses air pressure communicated to said valve pneumatic controller.

6. The apparatus of claim 1 wherein said power take-off control means comprises a power take-off pneumatic controller connectable to an air source on the vehicle and responsive to said power take-off engaging and disengaging signals.

7. The apparatus of claim 1 wherein:

said clutch control means comprises:

a clutch controller; and a clutch switch having a clutch engaging position for communicating said clutch engaging signal to said clutch controller and a clutch disengaging position for communicating said clutch disengaging signal to said clutch controller; and said remote control can transmit said clutch disengaging signal and said clutch engaging signal to said clutch controller when said clutch switch is in said clutch disengaging position.

8. The apparatus of claim 1 wherein:

said valve control means comprises:

a valve controller; and a valve switch having a valve opening position for communicating said valve opening signal to said valve controller and a valve closing position for communicating said valve closing signal to said valve controller.

9. The apparatus of claim 1 wherein:

said power take-off control means comprises:

a power take-off controller; and a power take-off switch having a power takeoff engaging position for communicating said power take-off engaging signal to said power take-off controller and a power take-off disengaging position for communicating said power take-off disengaging signal to said power take-off controller.

10. The apparatus of claim 1 further comprising throttle control means for opening an engine throttle of the vehicle in response to a throttle opening signal and closing the throttle in response to a throttle closing signal; and said remote control means being adapted for transmitting said throttle opening and closing signals.

11. The apparatus of claim 10 wherein said throttle control means comprises a throttle controller connectable to an electrical air source of the vehicle and responsive to said throttle opening and closing signals.

12. The apparatus of claim 10 wherein:

said throttle control means comprises:

a throttle controller; and a throttle switch having a throttle opening and closing position; and said remote control can transmit said throttle opening and closing signals to said throttle controller when said throttle switch is in said throttle closing position.

13. The apparatus of claim 10 wherein:

the delivery vehicle is also of the type having a hose in communication with the flow valve and a reel for the hose; and said remote control is also adapted for selectively sending a hose reel winding signal to the reel such that the reel rotates in a direction for winding the hose thereon when said clutch disengaging signal is communicated to said clutch control means and said throttle closing signal is communicated to said throttle control means, a hose reel unwinding signal such that the reel is rotated in a direction for unwinding the hose therefrom when said clutch disengaging signal is communicated to said clutch control means and said throttle opening signal is communicated to said throttle control means, and a hose reel stop signal to stop winding and unwinding of the reel.

14. The apparatus of claim 1 further comprising emergency shutdown means for substantially simultaneously shutting off the engine of the vehicle, closing the flow valve and disengaging the power take-off in response to a shutdown signal, wherein said remote control is adapted for transmitting said shutdown signal.

15. The apparatus of claim 14, wherein said shutdown signal comprises an engine stop signal, said valve closing signal and said power take-off disengaging signal.

16. The apparatus of claim 1 wherein:

the delivery vehicle is also of the type having a hose in communication with the flow valve and a reel for the hose; and said remote control signal is also adapted for selectively sending a hose reel winding signal to the reel for winding the hose thereon, a hose reel unwinding signal for unwinding the hose therefrom and a hose reel stop signal to stop winding and unwinding of the reel.

17. The apparatus of claim 16 wherein:

the reel will only rotate in a winding direction when said clutch disengaging signal is sent to said clutch control means and said throttle closing signal is sent to said throttle control means; and the hose will only rotate in an unwinding direction when said clutch disengaging signal is sent to said clutch control means and said throttle opening signal is sent to said throttle control means.

18. The apparatus of claim 17 wherein:

said clutch control means comprises:

a pneumatic clutch controller connectable to an air source on the vehicle and responsive to said clutch engaging and disengaging signals; and a clutch pressure switch in pneumatic communication with said clutch pneumatic controller and connected to the reel motor such that the reel motor will rotate only when said clutch pressure switch senses air pressure communicated to said clutch pneumatic controller.

19. A delivery vehicle for transporting liquid and delivering the liquid to a storage location, said vehicle comprising:

a rolling chassis having a plurality of wheels thereon including a plurality of drive wheels;

an engine on said chassis;

a transmission connected to said engine and adapted for transmitting power from said engine to said drive wheels;

a cargo tank mounted on the chassis for holding a quantity of the liquid;

a flow valve in communication with the cargo tank;

fluid transferring means having an inlet in communication with said flow valve and an outlet, for transferring liquid from said cargo tank;

a delivery hose in communication with said outlet of said fluid transferring means and having an end adapted for connection to the storage location;

a power take-off on said transmission and connected to said fluid transferring means, said power take-off having an engaged position wherein power from said engine is transferred to said fluid transferring means, and a disengaged position disengaged from said engine thereby preventing transfer of power from said engine to said fluid transferring means;

a transmission controller for engaging said transmission in response to a transmission engaging signal and disengaging said transmission in response to a transmission disengaging signal;

a valve controller for opening said flow valve in response to a valve opening signal and closing said valve in response to a valve closing signal;

a power take-off controller for engaging said power take-off in response to a power take-off engaging signal and disengaging said power take-off in response to a power take-off disengaging signal; and a radio remote control for selectively transmitting said transmission engaging and disengaging signals.

20. The vehicle of claim 19 wherein:

said transmission is a manual transmission comprising a clutch;

said transmission controller comprises a clutch controller;

said transmission engaging signal is a clutch engaging signal sent to said clutch controller; and said transmission disengaging signal is a clutch disengaging signal sent to said clutch controller.

21. The apparatus of claim 20 wherein:

said clutch controller comprises a manual switch having clutch engaging and disengaging positions; and said remote control can transmit said clutch engaging and disengaging signals when said switch is in said clutch disengaging position.

22. The vehicle of claim 20 further comprising an air source:

wherein, said clutch controller is a pneumatic controller connected to said air source.

23. The vehicle of claim 22 further comprising:

a clutch pressure switch in pneumatic communication with said clutch controller; and a clutch indicator light connected to said clutch pressure switch such that said indicator light is illuminated when said clutch pressure switch senses air pressure communicated to said clutch controller.

24. The apparatus of claim 19 wherein:

said transmission is an automatic transmission;

said transmission controller and said power take-off controller are combined as a single controller characterized by a solenoid connected to said automatic transmission;

said transmission engaging signal and said power take-off engaging signal are combined as a single engaging signal communicated to said solenoid; and said transmission disengaging signal and said power take-off disengaging signal are combined as a single disengaging signal communicated to said solenoid.

25. The vehicle of claim 19 further comprising an air source:

wherein, said valve controller is a pneumatic controller connected to said air source.

26. The vehicle of claim 25, further comprising:

a valve pressure switch in pneumatic communication with said valve controller; and a valve indicator light connected to said valve pressure switch such that said valve indicator light is illuminated when said valve pressure switch senses air pressure communicated to said valve controller.

27. The vehicle of claim 19 further comprising an air source:

wherein, said power take-off controller is a pneumatic controller connected to said air source.

28. The vehicle of claim 19 wherein:

said valve controller comprises a manual switch having valve opening and closing positions; and said remote control can transmit said valve closing signal when said switch is in said opening position.

29. The vehicle of claim 19 wherein:

said power take-off controller comprises a manual switch having power take-off engaging and disengaging positions; and said remote control can transmit said power take-off disengaging signal when said switch is in said power take-off engaging position.

30. The vehicle of claim 19 wherein:

said vehicle further comprises a throttle controller for opening a throttle of said engine in response to a throttle opening signal and closing said throttle in response to a throttle closing signal; and said remote control can transmit said throttle opening and closing signals.

31. The apparatus of claim 30 wherein:

said throttle controller comprises a manual switch having throttle opening and closing positions; and said remote control can transmit said throttle opening and closing signals when said switch is in said throttle closing position.

32. The vehicle of claim 30 further comprising:

a reel on which said hose may be wound for storage; and a reel motor for winding said hose onto said reel in response to a reel winding signal, unwinding said hose from said reel in response to a reel unwinding signal and stopping said reel in response to a reel stop signal;

wherein, said remote control can transmit said reel winding signal, said reel unwinding signal and said reel stop signal.

33. The vehicle of claim 32 wherein:

said reel motor can only rotate in a winding direction when said transmission disengaging signal is sent to said transmission controller and said throttle closing signal is sent to said throttle controller; and said reel can only rotate in an unwinding direction when said transmission disengaging signal is sent to said transmission controller and said throttle opening signal is sent to said throttle controller.

34. The vehicle of claim 19 further comprising:

a reel on which said hose may be wound for storage; and a reel motor for winding said hose onto said reel in response to a reel winding signal, unwinding said hose from said reel in response to a reel unwinding signal and stopping said reel in response to a reel stop signal;

wherein, said remote control can transmit said reel winding signal, said reel unwinding signal and said reel stop signal.

35. The apparatus of claim 19 wherein said fluid transferring means comprises a pump having a shaft connected to and driven by said power take-off.

36. A method of delivering liquid from a delivery vehicle to a storage vessel, said method comprising the steps of:

(a) opening a flow valve in communication with a tank of the vehicle so that the tank is placed in communication with a pump on the vehicle;

(b) disengaging a clutch on the vehicle;

(c) engaging a power take-off on the vehicle so that power from an engine on the vehicle may be transferred to the pump when the clutch is engaged;

(d) extending a delivery hose from the vehicle;

(e) connecting a hose valve on an end of the hose to the storage vessel;

(f) opening the hose valve;

(g) remotely engaging the clutch so that power is transferred to the pump and liquid is pumped out of the tank and through the delivery hose into the storage vessel;

(h) remotely disengaging the clutch when a quantity of liquid in the storage vessel reaches a desired level;

(i) closing the hose valve;

(j) disconnecting the delivery hose from the storage vessel; and (k) returning the delivery hose to the vehicle.

37. The method of claim 36 further comprising:

after step (g), remotely opening a throttle of the vehicle to increase the speed of the power take-off and pump.

38. The method of claim 37 further comprising:

prior to step (h), remotely closing the throttle.

39. The method of claim 36 wherein step (d) comprises:

unwinding the delivery hose from a reel on the vehicle.

40. The method of claim 39 wherein:

the reel is a powered reel; and step (d) comprises:

remotely actuating the reel to unwind the delivery hose therefrom.

41. The method of claim 40 further comprising:

prior to step (d), remotely opening a throttle of the vehicle to increase the speed of the engine.

42. The method of claim 39 wherein:

the reel is a powered reel; and step (k) comprises:

remotely actuating the reel to rewind the delivery hose thereon.

43. The method of claim 42 further comprising:

prior to step (k), remotely closing a throttle of the vehicle to decrease the speed of the engine.

44. The method of claim 36 further comprising:

in an emergency situation, remotely disengaging the power take-off.

45. The method of claim 36 further comprising:

in an emergency situation, remotely closing the flow valve.

46. The method of claim 36 further comprising:

in an emergency situation, remotely stopping the engine.

47. The method of claim 36 further comprising, in an emergency, the steps of:

remotely disengaging the power take-off;

remotely closing the flow valve; and remotely stopping the engine.

*48. A control apparatus for use on a liquid delivery vehicle of the type having a liquid tank, a flow valve in communication with the liquid tank, a pump in communication with the flow valve, a power take-off connected to the pump for providing power thereto, a delivery hose in communication with the pump, and a hose reel on which the hose may be wound for storage, said apparatus comprising:*

*a hose reel drive means for rotating the hose reel;*

*a reel motor connected to said hose reel drive means for actuation thereof in response to a signal; and*

*a remote control for sending said signal to said reel motor.*

*49. The apparatus of claim 48 wherein:*

*said signal is a hose unwinding signal; and*

*said reel motor is adapted for unwinding the hose from the hose reel in response to said hose unwinding signal; and*

*said remote control is adapted for sending said hose unwinding signal to said reel motor.*

*50. The apparatus of claim 49 wherein the delivery vehicle is also of the type having a clutch for selectively connecting the power take-off to an engine of the vehicle, said apparatus further comprising:*

*clutch control means mounted on the vehicle for engaging the clutch in response to a clutch engaging signal and disengaging the clutch in response to a clutch disengaging signal;*

*wherein, said reel motor will only rotate the reel when said clutch disengaging signal is sent to said clutch control means.*

*51. The apparatus of claim 50 wherein:*

*said remote control is adapted for selectively sending said clutch engaging and disengaging signals to said clutch control means.*

*52. The apparatus of claim 50 wherein:*

*said clutch control means comprises:*

*a clutch pneumatic controller connectable to an air source on the vehicle and responsive to said clutch engaging and disengaging signals; and*

*a clutch pressure switch in pneumatic communication with said clutch pneumatic controller and connected to said reel motor such that said reel motor will rotate only when said clutch pressure switch senses air pressure communicated to said clutch pneumatic controller.*

*53. The apparatus of claim 48 further comprising throttle control means for opening an engine throttle of the vehicle in response to a throttle opening signal enclosing the throttle in response to a throttle closing signal.*

*54. The apparatus of claim 53 wherein:*

*said reel motor will only rotate the reel in a winding direction when said throttle closing signal is sent to said throttle control means; and*

*said reel motor will only rotate the reel in an unwinding direction when said throttle opening signal is sent to said throttle control means.*

*55. The apparatus of claim 53 wherein said remote control means is adapted for transmitting said throttle opening and closing signals.*

*56. The apparatus of claim 53 wherein:*

*said throttle control means comprises:*

*a throttle controller; and*

*a throttle switch having a throttle opening and closing position.*

*57. The apparatus of claim 56 wherein:*

*said remote control is adapted for transmitting said throttle opening and closing signals to said throttle controller when said throttle switch is in said throttle closing position.*

*58. The apparatus of claim 48 wherein said remote control is wireless.*

*59. The apparatus of claim 48 further comprising an emergency shutdown for closing the flow valve and shutting off power to the pump and said hose reel drive means.*

*60. A control apparatus for use on a liquid delivery vehicle of the type having a liquid tank, a flow valve in communication with the liquid tank, a pump in communication with the flow valve, said apparatus comprising:*

*valve control means for closing the valve in response to a valve closing signal; and*

*a remote control for sending said valve closing signal to said valve control means.*

*61. The apparatus of claim 60 wherein:*

*said valve control means is also adapted for opening the valve in response to a valve opening signal.*

*62. The apparatus of claim 61 wherein said valve control means comprises a valve pneumatic controller connectable to an air source on the vehicle and responsive to said valve opening and closing signals.*

*63. The apparatus of claim 62 wherein:*

*said valve control means further comprises:*

*a valve pressure switch in pneumatic communication with said valve pneumatic controller; and*

*a valve indicator light connected to said valve pressure switch such that said valve indicator light is illuminated when said valve pressure switch senses air pressure communicated to said valve pneumatic controller.*

*64. The apparatus of claim 60 further comprising:*

*power take-off control means mounted on the vehicle for engaging the power take-off in response to a power take-off engaging signal and disengaging the power take-off in response to a power take-off disengaging signal.*

*65. The apparatus of claim 64 wherein said remote control is adapted for transmitting said power take-off disengaging signal and said power take-off engaging signal.*

*66. The apparatus of claim 65 wherein:*

*said power take-off controller comprises a manual switch having power take-off engaging and disengaging positions; and*

*said remote control is adapted for transmitting said power take-off disengaging signal when said switch is in said power take-off engaging position.*

*67. The apparatus of claim 60 wherein said remote control is wireless.*

*68. The apparatus of claim 60 further comprising an emergency shutdown for sending said valve closing signal and shutting off power to the pump.*

*69. The apparatus of claim 60 further comprising:*

*ignition control means for disengaging an ignition of the engine from a power source on the vehicle in response to an engine shutdown signal; and*

*wherein, said remote control is adapted for transmitting said engine shutdown signal to said ignition control means.*

*70. A control apparatus for use on a liquid delivery vehicle of a type having a liquid tank, a flow valve in communication with the liquid tank, a pump in communication with the flow valve, a power take-off connected to the pump for providing power thereto from the engine and an engine throttle on the engine, said apparatus comprising:*

*throttle control means for opening an engine throttle of the vehicle in response to a throttle opening signal and closing the throttle in response to a throttle closing position; and*

*a remote control for transmitting the throttle opening and closing signals.*

*71. The apparatus of claim 69 wherein said throttle control means comprises a throttle controller connectable to an electrical air source of a vehicle and responsive to the throttle opening and closing signals.*

*72. The apparatus of claim 70 wherein:*

*said throttle control means further comprises:*

*a throttle switch having a throttle opening and closing position;*

*wherein, said remote control is adapted for transmitting said throttle opening and closing signals to said throttle controller when said throttle switch is in said throttle closing position.*

*73. The apparatus of claim 69 further comprising:*

*clutch control means mounted on the vehicle for engaging a clutch of the vehicle in response to a clutch engaging signal and disengaging the clutch in response to a clutch disengaging signal; and*

*wherein, said remote control is adapted for sending said clutch engaging and disengaging signals to said clutch control means.*

*74. The apparatus of claim 72 wherein said clutch control means comprises a clutch pneumatic controller connectable to an air source on the vehicle and responsive to said clutch engaging and disengaging signals.*

*75. The apparatus of claim 73 wherein:*

*said clutch control means further comprises:*

*a clutch pressure switch in pneumatic communication with said clutch pneumatic controller; and*

*a clutch indicator light connected to said clutch pressure switch such that said clutch indicator light is illuminated when said clutch pressure switch senses air pressure applied to said clutch pneumatic controller.*

*76. The apparatus of claim 69 wherein said remote control is wireless.*

*77. The apparatus of claim 69 further comprising an emergency shutoff for closing the valve, shutting off power to the pump and closing the throttle.*

*78. A control apparatus for use on a liquid delivery vehicle of the type having a liquid tank, a flow valve in communication with the liquid tank, a pump in communication with the flow valve, a transmission connected to the engine, a power take-off on the transmission and connected to the pump for providing power thereto, said apparatus comprising:*

*valve control means mounted on the vehicle for closing the valve in response to a valve closing signal;*

*power take-off control means mounted on the vehicle for disengaging the power take-off in response to a power take-off disengaging signal; and*

*a remote control for sending said valve closing signal and said power take-off disengaging signal.*

*79. The apparatus of claim 77 further comprising:*

*emergency shutdown means for substantially simultaneously shutting off the engine of the vehicle, closing the flow valve and disengaging the power take-off in response to a shutdown signal; and*

*wherein said remote control is adapted for transmitting said shutdown signal.*

*80. The apparatus of claim 78 wherein said power shutdown signal comprises an engine stop signal, said valve closing signal and said power take-off disengaging signal.*

*81. The apparatus of claim 77 wherein:*

*said transmission is a manual transmission comprising a clutch; and*

*further comprising clutch control means mounted on the vehicle for disengaging the clutch in response to a clutch disengaging signal; and*

*wherein, said remote control is adapted for sending said clutch disengaging signal.*

*82. The apparatus of claim 77 wherein:*

*said transmission is an automatic transmission;*

*said power take-off control means is characterized by a transmission controller connected to said automatic transmission; and*

*said power take-off disengaging signal comprises a transmission disengaging signal.*

*83. The apparatus of claim 81 wherein said transmission controller comprises a solenoid.*

*84. The apparatus of claim 77 wherein said remote control is wireless.*

*85. A control apparatus for use on a delivery vehicle of a type having a liquid tank, a flow valve in communication with the liquid tank, a pump in communication with the flow valve, a power take-off connected to the pump and connectable to an engine of the vehicle for providing power to the pump, said apparatus comprising:*

*an ignition controller for disengaging an ignition of the engine from a power source on the vehicle in response to an engine shutdown signal; and*

*a remote control for transmitting said engine shutdown signal to said ignition controller.*

*86. The apparatus of claim 85 further comprising:*

*a valve controller for closing the flow valve in response to a valve closing signal; and*

*wherein, said remote control is adapted for transmitting said valve closing signal to said valve controller.*

* * * * *